United States Patent [19]

Flood et al.

[11] Patent Number: 5,059,008

[45] Date of Patent: Oct. 22, 1991

[54] WIDE ANGLE BEAM STEERER USING TRANSLATION OF PLURAL LENS ARRAYS

[75] Inventors: Kevin M. Flood, East Pikeland Township, Chester County; William J. Cassarly, Upper Merion Township, Montgomery County, both of Pa.

[73] Assignee: General Electric Company, King of Prussia, Pa.

[21] Appl. No.: 498,525

[22] Filed: Mar. 26, 1990

[51] Int. Cl.$^5$ .......................... G02B 26/08; G02B 3/10
[52] U.S. Cl. .................................... 359/196; 359/721; 359/36
[58] Field of Search ................. 350/437, 334, 484–486, 350/245, 247, 320, 321; 343/754, 854, 753, 755, 909

[56] References Cited

U.S. PATENT DOCUMENTS 4,842,376 1/1989 Braatz et al. ......................... 350/342
4,937,539 6/1990 Grinberg et al. ................. 350/347 E

OTHER PUBLICATIONS

"Binary Micro Optics: An Application to Beam Steering", by Goltsos et al., published by Lincoln Laboratories in connection with SPIE: OE LASE 89, 1052 (Jan. 1989).

"Optical Beam Steering Using a Multichannel Lithium Tantalate Crystal", by Meyer, published at pp. 613-616 in the Mar., 1972 Issue of Applied Optics, vol. 11, No. 3.

"Continuous Wide Angle Beam Steering Using Translation of Binary Microlens Arrays and a Liquid Crystal Phased Array", K. M. Flood et al., publication made at the Jan., 1990 OE LASE conference Los Angeles, Calif.

"Phase Control of Coherent Diode Laser Arrays Using Liquid Crystals", published in connection with SPIE: OE LASE 89, vol. 1043, paper No. 18, Jan. 1989.

Primary Examiner—Bruce Y. Arnold
Assistant Examiner—James Phan
Attorney, Agent, or Firm—William H. Meise

[57] ABSTRACT

A beam steering arrangement for a plurality of beams of electromagnetic radiation from a like plurality of sources arrayed with a preselected source-to-source spacing includes a first lens array. The period of the lenses corresponds to that of the sources. The lenses of the first array may be converging or diverging lenses, but when illuminated by the sources, each produces a beam of light including at least a diverging portion. A second lens array is cascaded with the first lens array, with the lenses of the second array illuminated by the diverging beam portions. The second lens array collimates the diverging beam portions. The second lens array is translated in a direction approximately transverse to the undeflected beam direction in order to scan or deflect the collimated beams. This may result in overfilling of the input apertures of the lenses of the output lens array, with consequent reduction in the amplitude of the main beam, and with generation of beams of lower intensity in other directions. The first lens array is translated in a fashion which scans the diverging beam portions to prevent aperture overfilling. In particular embodiments of the invention, the lenses of the output lens array are converging lenses, and the input lens array may include either converging or diverging lenses. In another embodiment of the invention, the pair of translatable lens arrays is cascaded with an array of phase shifters for providing piston phase correction by which a continuous range of scan directions may be achieved.

17 Claims, 9 Drawing Sheets

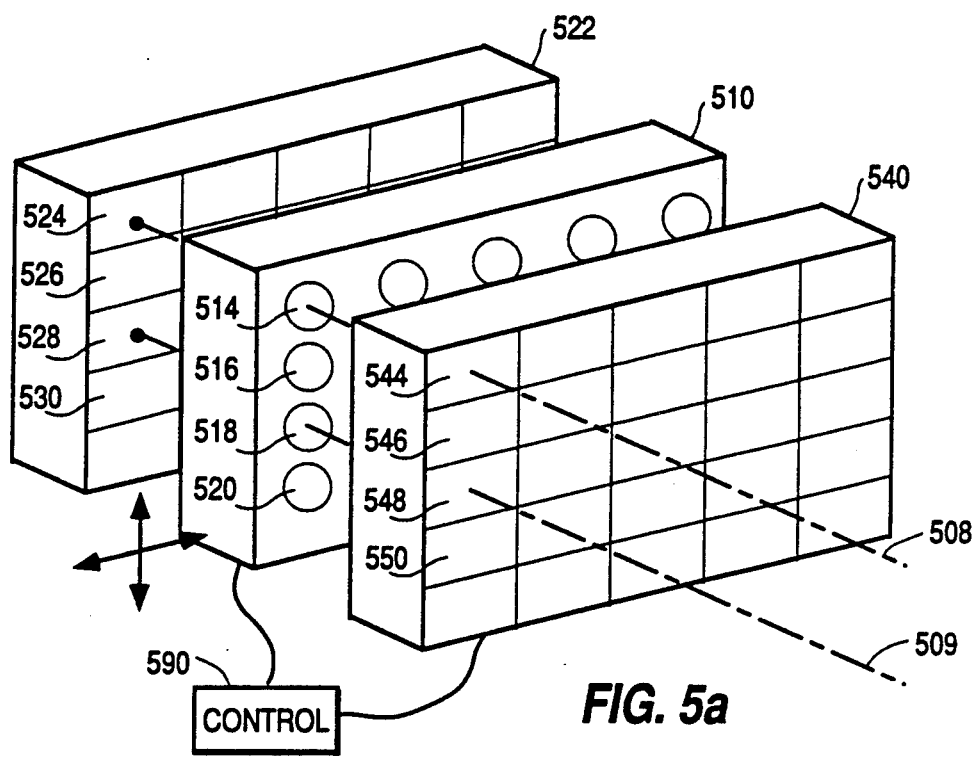
FIG. 5a
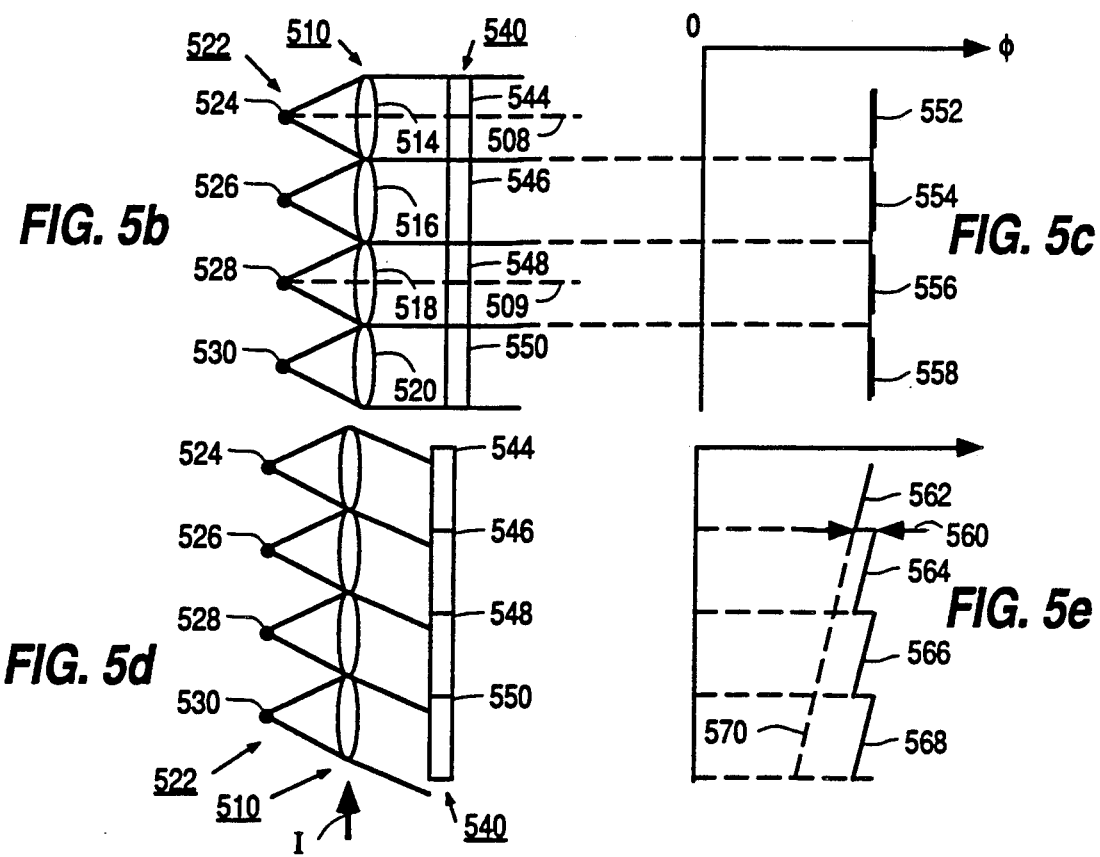
FIG. 5b
FIG. 5c
FIG. 5d
FIG. 5e

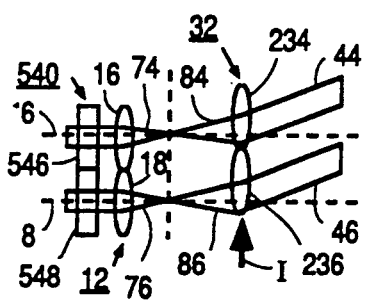
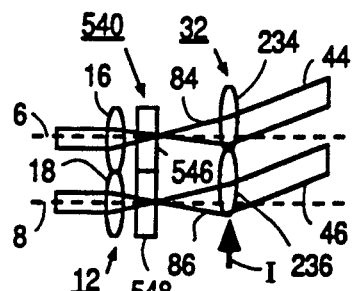
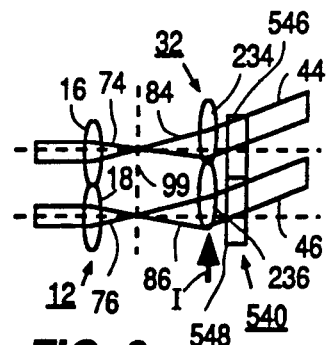
FIG. 8a  FIG. 8b  FIG. 8c
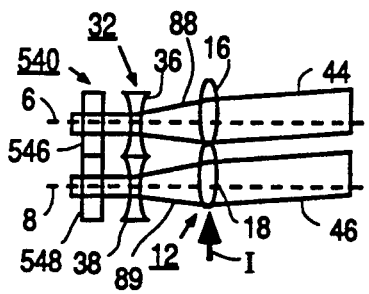
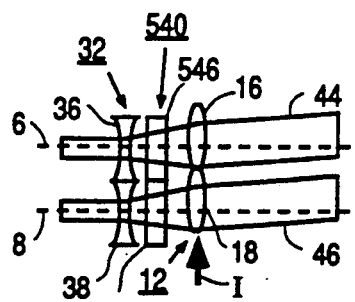
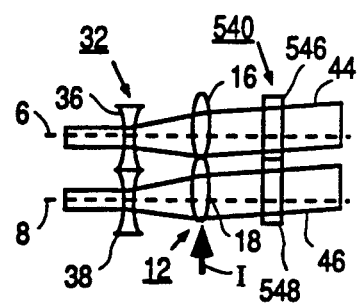
FIG. 9a  FIG. 9b  FIG. 9c
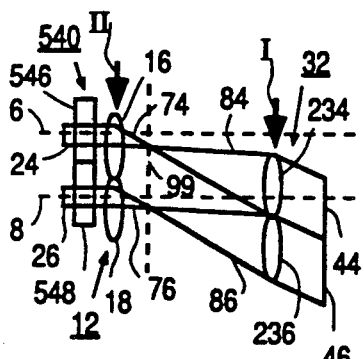
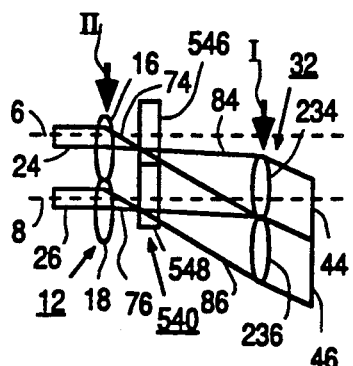
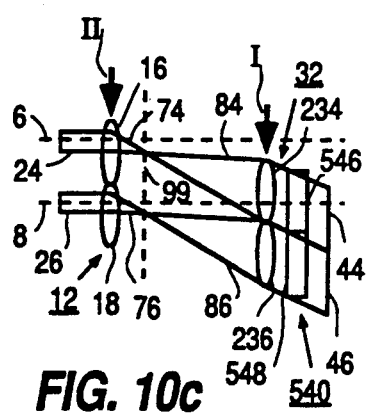
FIG. 10a  FIG. 10b  FIG. 10c
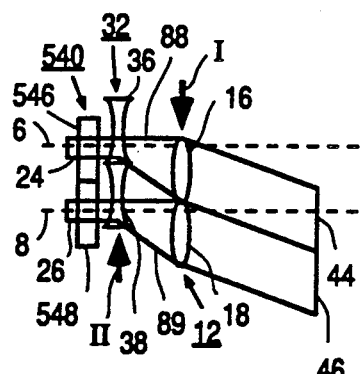
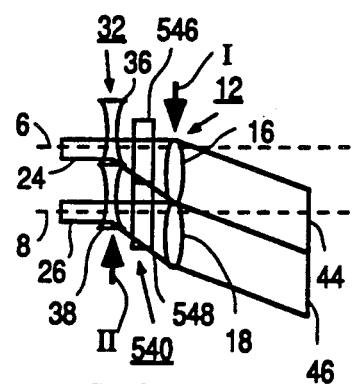
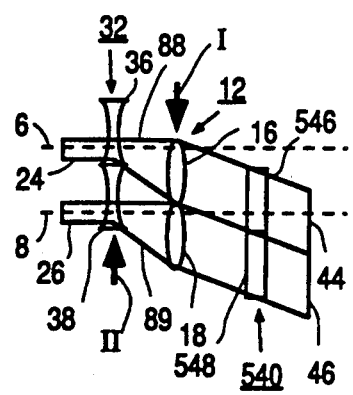
FIG. 11a  FIG. 11b  FIG. 11c

WIDE ANGLE BEAM STEERER USING TRANSLATION OF PLURAL LENS ARRAYS

BACKGROUND OF THE INVENTION

This invention relates to the steering of beams of electromagnetic radiation, such as light beams, by relative translation of lens arrays in combination with phase shifters.

Coherent beams of electromagnetic radiation are scanned for use in communication systems, radar, weapons, welding, supermarket label checking, and optical disc reading and writing. Very often, the transmitted beams are made up from a combination of plural individual beams.

The scanning function may be provided by gimballed, mechanically moveable mirrors, lenses or reflectors. However, the mass of such structures may impede the ability to scan in a random fashion, although repetitive scanning at high speeds may be possible. An article entitled "Binary micro optics: an application to beam steering", by Goltsos et al., published by Lincoln Laboratory in connection with the SPIE: OE LASE 89, 1052 (January 89) describes the relative translation of a pair of microlens arrays for beam steering. As described in the article, beam steering is accomplished by relative translation of a pair of microlens arrays cascaded in the path of an array of light beams. The translation of the microlens arrays is in a direction lateral to the beam direction, and the magnitude of the motion which is required for scanning is less than the diameter of the individual lens of the array.

FIG. 1a illustrates a portion of a cascade of two microlens arrays. In FIG. 1a, a scanner designated generally as 10 includes a first microlens array 12 which includes individual lenses 14, 16, 18 and 20. Adjacent light beams illustrated as 22, 24, 26 and 28 fill the apertures of lenses 14, 16, 18 and 20, respectively. Lenses 14–20 cause the light beams to converge toward focal points (not illustrated). A second microlens array 32 includes diverging or defocussing lenses 34, 36, 38 and 40. Microlens array 32 is capable of translation relative to microlens array 12 in a direction of arrows 41. When the lenses of the microlens arrays 12 and 32 are registered, i.e., when the corresponding lenses are coaxial as illustrated in FIG. 1a, the output light beams, illustrated as 42, 44, 46 and 48, propagate parallel to the direction of propagation of incoming light beams 22, 24, 26 and 28, respectively.

FIG. 1b illustrates as plots 52, 54, 56 and 58 the phase of the wave fronts associated with light beams 42, 44, 46 and 48, respectively, as a function of distance from an arbitrary reference point relative to the lens arrays. The spaces between plots 52, 54, 56 and 58 represent regions in which the light beams have a small amplitude. In FIG. 1b, plots 52, 54, 56 and 58 are, in effect, portions or continuations of the same straight dash-line 51 having the same phase. Other plots could be made at other distances from the lens arrays, with the phases increasing gradually with increasing distance from the lens arrays, and with the phases recurring if reduced by subtraction of multiples of $2\pi$.

As illustrated in FIG. 1a, the output apertures of the lenses of array 32 are not filled. If the output apertures were filled, plots 52, 54, 56 and 58 of FIG. 1b would run together to create a continuous phase front representing a coherent beam of light, the direction of propagation of which is normal to the phase front.

FIG. 1c illustrates a portion of scanner 10 of FIG. 1a, with lenses 36 and 38 of lens array 32 translated vertically upward (in the direction of arrow I) relative to corresponding lenses 16 and 18 of lens array 12, and with the input light beams 24 and 26 illustrated as not completely filling the input aperture to enable the beam paths to be clearly depicted. As illustrated, output beams 44 and 46 propagate in a direction different from that of the incoming beams, i.e. the beams have been scanned. FIG. 1d illustrates the phase of the wave fronts of beams 44 and 46. As illustrated in FIG. 1b, phase fronts 64 and 66 exhibit a slope, the normal to which defines the direction of propagation of the beam. As also illustrated in FIG. 1d, there is an offset, which is illustrated between arrows 50, which represents the offset between the phases of adjacent continuations of beams 44 and 46 of FIG. 1c. If this phase offset is zero or zero plus a multiple of $2\pi$, the beams are in-phase for the illustrated direction of propagation, and a beam maximum occurs. In general, however, the phase offset will vary with the scanning direction, with the result that for some scanning directions the individual beams will be mutually out-of-phase with another beam, resulting in destructive interference. This in turn results in a far-field scanned radiation pattern which contains grating lobes or angles at which the radiated energy is high, and other angles at which the radiated energy is low. The result of translating a lens array in one direction is to gradually reduce the amplitude of one grating lobe, while the adjacent grating lobe becomes larger. The Goltsos et al. article suggests the use of a scanning mirror at the system input for fine or vernier beam steering. Such a scanning mirror has the disadvantages of a mechanical system referred to above, and in addition, causes the beams to enter the lenses of the lens array at an angle, which reduces the efficiency of the lens. This may be particularly important when two lens arrays are involved, because the entry at an angle occurs in both lens arrays, so the losses are cascaded. It is desirable to scan in a manner which allows the beam(s) to be directed at any angle, and not just at angles at which grating lobes occur.

FIG. 2a illustrates a lens array similar to that of FIG. 1, with the lenses of the two arrays registered, and FIG. 2b illustrates the same arrangement with one of the arrays laterally offset by translation in the direction of arrow I. In FIG. 2, elements corresponding to those of FIG. 1 are designated by the same reference numerals. In FIG. 2a, circular input light beams 24 and 26 are centered on axes 6 and 8, respectively, and fill the apertures of converging lenses 16 and 18, pursuant to the Goltsos et al. suggestion. Lenses 16 and 18 focus the light to form converging beam portions 74 and 76, respectively, which come to a focus at a focus plane 99. From focus plane 99, diverging beam portions 84 and 86 propagate toward the input apertures of converging lenses 234 and 236, respectively. As illustrated, the spacings are such that beam portions 84 and 86 do not fill the apertures of lenses 234 and 236. Lenses 234 and 236 collimate the beams to produce parallel output beams 44 and 46, respectively, which are centered on axes 4 and 6, respectively.

FIG. 2b illustrates the result of moving lens array 32 of FIG. 1a downward, in the direction of arrow I. As illustrated, light beams 84 and 86 intercept lenses 234 and 236 in a region in which the lens curvature causes output beams 44 and 46 to be deflected or scanned downward.

FIG. 3a is identical in subject matter to FIG. 1c, and is included as a reference for comparison with FIG. 3b. In FIG. 3b, array 32, which includes diverging lenses 36 and 38, has been moved or translated upward in the direction of arrow I, thereby causing exit beams 44 and 46 to be deflected downward.

By comparison of FIGS. 2b and 3b, it is apparent that deflection of output beams in a given direction in accordance with the Goltsos et al. arrangement requires that the output lens array be moved in the direction of the desired deflection in the case of converging lens array, and in a direction opposite to the desired scanning direction for a diverging lens array.

In FIG. 4, an arrangement similar to that of FIG. 2 has had its output lens array 32 translated upward by an amount $\Delta$ in an attempt to increase the scan angle. As illustrated, translation $\Delta$ is sufficient to cause diverging light beam portion 84 to illuminate portions of both lenses 234 and 236. This may be viewed as a form of overfilling of the aperture of lens 234. As illustrated, output beam 244 is deflected or scanned upward by lens 234. That portion of beam 84 falling onto lens 236, however, is deflected downward. When overfilling of the aperture occurs in this manner, the far-field peak beam amplitude decreases, because the effective aperture decreases. Put another way, translation of the moving lens array in the direction of the arrow in any of FIGS. 2, 3 or 4 may result in a secondary portion of each beam (246) being directed away from the main scanned beam (244). The energy which goes into the secondary beam is not available for the main beam, and the secondary beam amounts to a scanning sidelobe which may not be desired. The undesirable effect of overfilling also occurs with the arrangement of FIG. 3. It would be advantageous to be able to translate the lenses to achieve additional scanning, with less loss of peak amplitude.

SUMMARY OF THE INVENTION

A beam steering arrangement for a plurality of beams of electromagnetic radiation from a like plurality of sources arrayed with a preselected source-to-source spacing includes a first lens array. The period of the lenses corresponds to that of the sources. The lenses of the first array may be converging or diverging lenses, but when illuminated by the sources, each produces a beam of light including at least a diverging portion. A second lens array is cascaded with the first lens array, with the lenses of the second array illuminated by the diverging beam portions. The second lens array collimates the diverging beam portions. The second lens array is translated in a direction approximately transverse to the undeflected beam direction in order to scan or deflect the collimated beams. This may result in overfilling of the input apertures of the lenses of the output lens array, with consequent reduction in the amplitude of the main beam, and with generation of beams of lower intensity in other directions. The first lens array is translated in a fashion which scans the diverging beam portions to prevent aperture overfilling. In particular embodiments of the invention, the lenses of the output lens array are converging lenses, and the input lens array may include either converging or diverging lenses. In another embodiment of the invention, the pair of translatable lens arrays is cascaded with an array of phase shifters for providing piston phase correction by which a continuous range of scan directions may be achieved.

DESCRIPTION OF THE DRAWING

FIGS. 1a, 1b, 1c and 1d are jointly referred to as FIG. 1;

FIG. 5a is an isometric or perspective view of a two-dimensional array of light sources such as an array of lasers cascaded with a microlens array and a phase-shifter array in accordance with an aspect of the invention, FIGS. 5b and 5d are simplified side views of a portion of the arrangement of FIG. 5a, and FIGS. 5c and 5e are plots of phase profile of the beams for the arrangements of FIGS. 5b and 5d; respectively, FIGS. 5a, 5b, 5c, and 5d and 5e are jointly referred to as FIG. 5;

FIGS. 8a, 8b and 8c illustrate a cascade of two converging lens arrays, one translatable and one not, with a phase shifter array located in the cascade before, between and behind the lens arrays, respectively, in accordance with an aspect of the invention;

FIGS. 9a, 9b and 9c illustrate a cascade of a fixed diverging lens array with a translatable converging lens array, with a phase shifter array located in the cascade before, between and behind the lens arrays, respectively, in accordance with an aspect of the invention;

FIGS. 10a, 10b and 10c illustrate a cascade of a pair of translatable converging lens arrays, with a phase shifter array located in the cascade before, between and behind the lens arrays, respectively, in accordance with an aspect of the invention, FIGS. 11a, 11b and 11c illustrate a cascade of a translatable diverging lens array and a translatable converging lens array, with a phase shifter array located in the cascade before, between and behind the lens arrays, respectively, in accordance with an aspect of the invention.

DESCRIPTION OF THE INVENTION

Figure 1A:
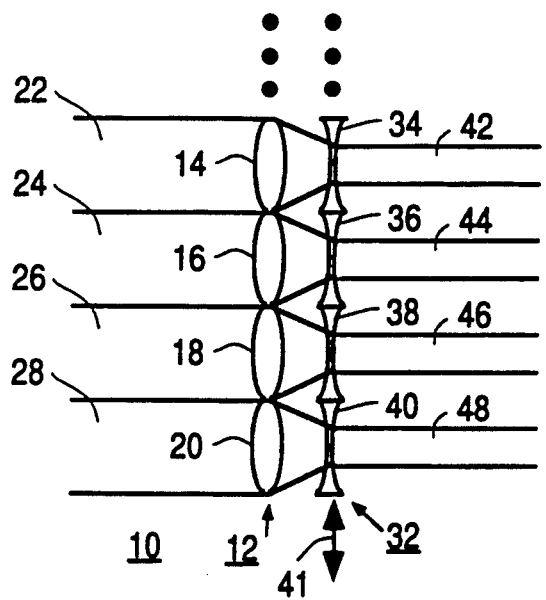
FIGS. 1a and 1c illustrate prior art microlens array pairs in untranslated and relatively translated conditions, respectively.
Figure 1B:
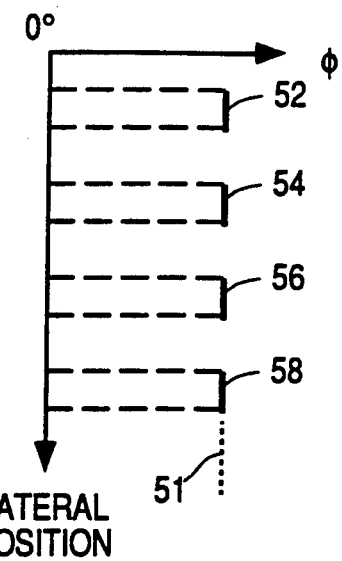
FIGS. 1b and 1d represent the phase response of the output beams of FIGS. 1a and 1c, respectively.
Figure 1C:
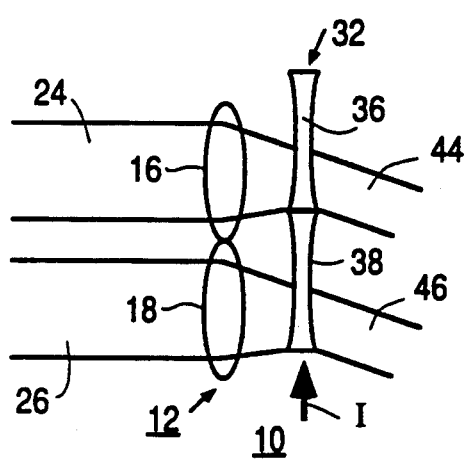
Figure 1D:
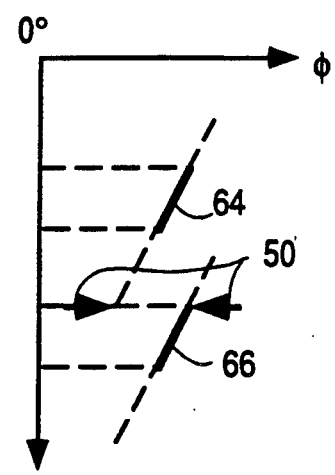

In FIG. 5a, a rectangular array 522 of small or point sources of electromagnetic (EM) radiation includes array elements 524, 526, 528 and 530. Radiation beams emitted from the sources of the array are centered on axes, such as axes 508 and 509, and pass through microlenses of a microlens array 510. For example, light from source 524 of source array 522 passes through microlens 514 of array 510. The microlenses of array 510 affect or modulate the phase distribution of the wavefronts of the electromagnetic radiation passing therethrough, in a manner which depends upon the curvature of the lens. The phase modulated light then passes through a phase shifter of phase shifter array 540. For example, light leaving microlens array 514 in the general direction of axis 508 passes in turn through phase shifter element or cell 544 of phase shifter array 540. FIGS. 5b and 5d are simplified elevation views of the arrangement of FIG. 5a.

A control arrangement illustrated as a block 590 in FIG. 5a is coupled, mechanically or electrically, as may be required, to microlens array 510 and to phase shifter array 540, for controlling the translation of the lenses of microlens array 510 and for controlling the phase shifts imparted by the phase shifters of the phase shifter array 540. The phase shifter array may be of the type described below, which is also described in the paper "Phase Control of Coherent Diode Laser Arrays Using Liquid Crystals", by Cassarly and Finlan, published as paper No. 18 in Volume 1043 in connection with the Proceedings of the SPIE: OE LASE 89 convention, January 1989.

FIG. 5b illustrates in simplified side view the light paths associated with the arrangement of FIG. 5a when the light sources of source array 522, the lenses of microlens array 510, and the phase shifters of phase shifter array 540 are registered or aligned coaxially. As illustrated in FIG. 5b, light leaving source 524 diverges, and is converted by converging lens 514 into a collimated beam, which passes through phase shifter 544, centered on axis 508. The light from each of sources 526, 528 and 530 similarly diverges from the source, is collimated by the associated converging lens 516, 518 and 520, respectively, and passes through the associated phase shifter 546, 548 and 550. FIG. 5c illustrates as plots 552, 554, 556 and 558 the phases of the portions of the wavefront leaving the phase shifter array. Under the illustrated conditions, the phase shifters are arranged to produce no phase shift relative to each other. The phase front of the beam is constant across the entire beam, resulting in a coherent combined beam extending parallel to axes 508 and 509.

FIG. 5d is similar to FIG. 5a, and corresponding elements are designated by the same reference numerals. In FIG. 5d, microlens array 510 is translated upward relative to source array 522 and phase shifter array 540. As illustrated, sources 524, 526, 528 and 530 are directional, and the beam of light which each emits illuminates only one lens. FIG. 5e illustrates the phase of the beams. As illustrated in FIG. 5e, line 562 represents the sloped phase of the beam leaving phase shifter 544. Similarly, plots 564, 566 and 568 represent the phase characteristics of the beams leaving phase shifters 546, 548 and 550, respectively. In accordance with an aspect of the invention, the phase shifters of phase shifter array 540 are controlled so that the phase error between adjacent portions of the wavefront (the phase between arrows 560 in FIG. 5e) is equal to zero or to an integer multiple of $2\pi$. Thus, the phase difference indicated as 560 in FIG. 2e, and all other such phase errors, are controlled by controller 590 of FIG. 5a to set the associated phase shifter to equal 0 or $2N\pi$. By reduction, this is equivalent to having the value of N equal to one. In effect, this creates a continuous phase across the entire combined beam, as suggested by plot 562 in combination with dashed line 570. The salient characteristic of the structure such as that of FIG. 5a in combination with controlled phase shifters is that beam scanning can be accomplished over a wide angle with minimized grating lobes. Put another way, the scanning is continuous rather than discontinuous. In this context, the term "scanning" means the ability to direct the beam at any selected angle within a range of possible angles.

A further advantage of the arrangement according to the invention is that, if the phase shifters of the phase array 540 are electrically controlled, the fine tune beam steering is nonmechanical. Additional advantages are that the use of multiple array elements tends to average out construction and other errors in each element, thereby providing high pointing accuracy. This may be particularly important in applications where the beam divergence is small. The translations of the microlens array 510 which are necessary to provide scanning are smaller than the lens diameters, and may be on the order of tens to hundreds of microns. Thus, inertia effects are minimized. Also, the assembly may be of small size, light weight, and may scan with little power consumption, which is advantageous for many applications but particularly for spacecraft. Further, the phased array portion of the assembly can be used to increase beam divergence, which may be useful in acquisition scenarios in which jitter at the transmitter site might cause the beam to miss the desired target.

Control 590 of FIG. 5a may use addressable memories (not separately illustrated) which are programmed with information relating to the mechanical actuator position for lens array 510 and with the voltage for each phase shifter, both as a function of angle. The information for the memories is initially established by adjusting the position of lens array 510 and the voltages of the phase shifters to direct the beam or beams at the desired angle. When the beam has been directed and adjusted at that angle, the lens position control information and the phase shifter voltage information is written into memory locations whose addresses represent the desired angle. When information relating to all the desired angles has been stored in memory, it is only necessary to read the memory or memories at the address(es) representing the desired angle, and to use the information read from the memories to control the arrays. It should be noted that each memory address might include only two items of information, namely the lens array actuator position and an electrical device signal which is divided in a fixed ratio for application of a part thereof to each phase shifter of the array, or the memory could include information relating to an individually selected voltage for each phase shifter element, so as to provide for correction of minor element-to-element phase discrepancies attributable to construction or other errors.

The sources of source array 522 of FIG. 5 have been described as directional, which will be the case if the sources are lasers, laser diodes or a single light-emitting diodes (LEDs). The array of sources could alternatively be an array of pinholes, whereby the light from the sources would not be directional. In this event, the main beam produced at the output of phase shifter array 540 would be as described in conjunction with FIG. 5, but there would in addition be an array of sidelobes of lesser amplitude, arising from the cross-illumination of the input apertures of the lenses of array 510 by nearby sources. Such side lobes may be advantageous for some uses and disadvantageous for other uses.

FIGS. 6a and 6b, and FIGS. 7a and 7b, illustrate portions of scanners using double-lens-array translation, and converging and/or diverging lenses. Each of the combinations can be cascaded with a piston phase shifter according to the invention to achieve continuous scanning, as described below. In accordance with an aspect of the invention, the input apertures are unfilled.

Figure 2A:
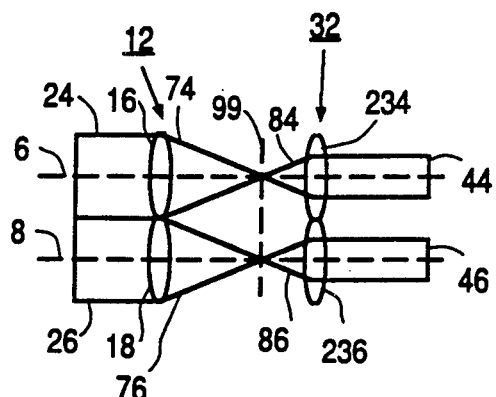
FIGS. 2a and 2b, referred to jointly as FIG. 2, are simplified illustrations of prior-art pairs of converging lens arrays in untranslated and translated conditions, respectively.
Figure 2B:
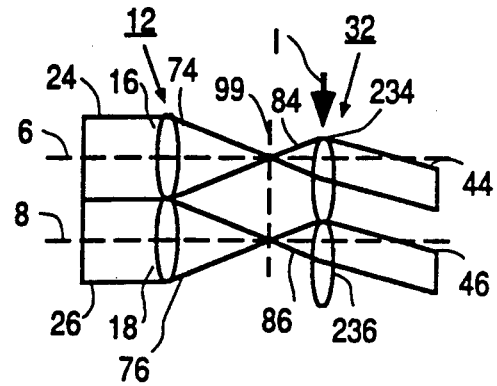
Figure 6A:
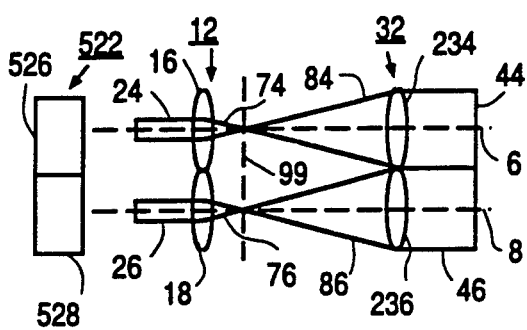
FIGS. 6a and 6b, referred to jointly as FIG. 6, illustrate the combination of an array of sources and a pair of converging lens arrays which are translatable relative to the source array in accordance with an aspect of the invention.

FIG. 6 illustrates an arrangement similar to that of FIG. 2. Elements of FIG. 6 corresponding to those of FIG. 2 are designated by the same reference numerals. As illustrated in FIG. 6a, sources 526 and 528 of a source array 522 produce light beams 24 and 26, respectively, which do not fill the input apertures of lenses 16 and 18, respectively, of lens array 12. However, exit beams 44 and 46 fill the exit apertures of lenses 234 and 236 of the array. If translation of lenses 234 and 236 were to be performed for scanning as in the prior art, without additional translation according to the invention, even a small amount of scanning would cause the beams to overfill into the adjacent lens, thereby resulting in reduction of peak beam amplitude and production of side lobes.

Figure 6B:
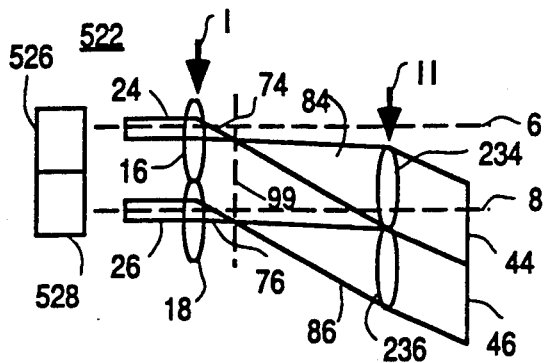

FIG. 6b illustrates translation of the lenses in accordance with the invention. As illustrated in FIG. 6b, lenses 16 and 18 of input lens array 12 are translated in the direction of arrow I, and lenses 234 and 236 of output lens array 32 are translated by a greater amount in the direction of arrow II. As illustrated, the directions of arrows I and II are downward. The translation of lenses 16 and 18 deflects beam portions 74, 76 and 84, 86 downward as illustrated in FIG. 6b, thereby causing the beams entering output lenses 234 and 236 to continue to fill but not overfill the apertures, and to thereby continue to associate each beam with a corresponding one of the lenses of the array. In this manner, increased scanning can be achieved without amplitude reduction of the beam due to overfilling of the apertures.

Figure 3A:
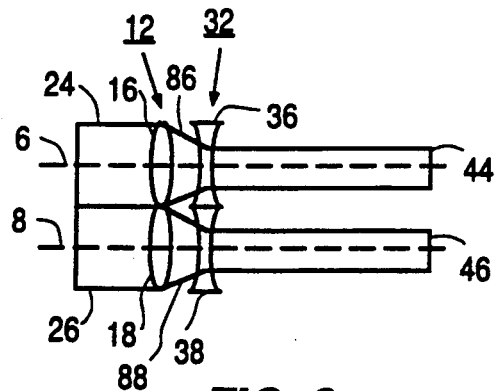
FIGS. 3a and 3b, referred to jointly as FIG. 3, are simplified illustrations of prior-art pairs of mixed converging and diverging lens arrays in untranslated and translated conditions, respectively.
Figure 3B:
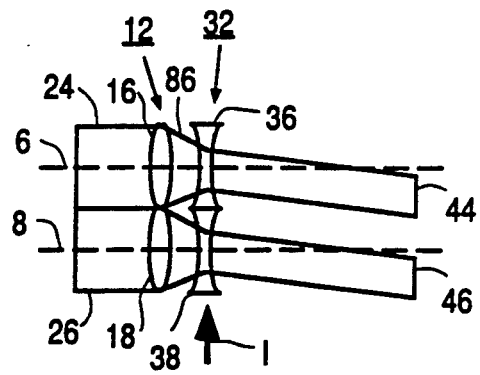
Figure 4:
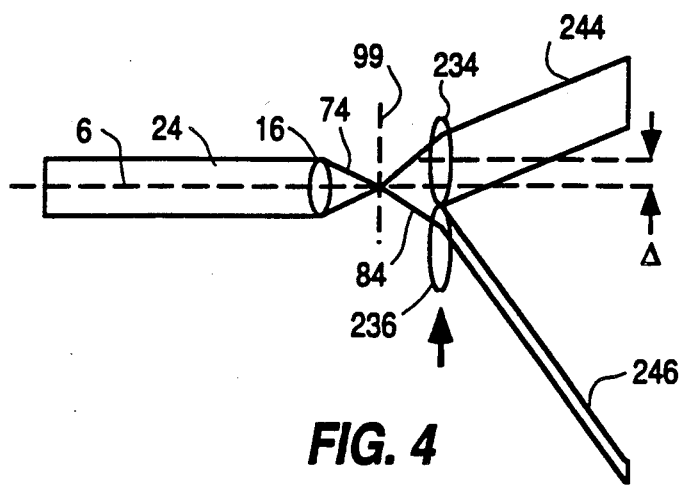
FIG. 4 illustrates the effect of overfilling an aperture of the arrangement of FIG. 2 due to excessive translation.
Figure 7A:
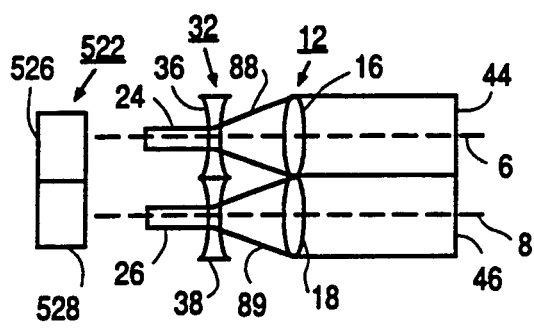
FIGS. 7a and 7b, referred to jointly as FIG. 7, are similar to FIGS. 6a and 6b, respectively, but one of the lens arrays is a diverging lens array.
Figure 7B:
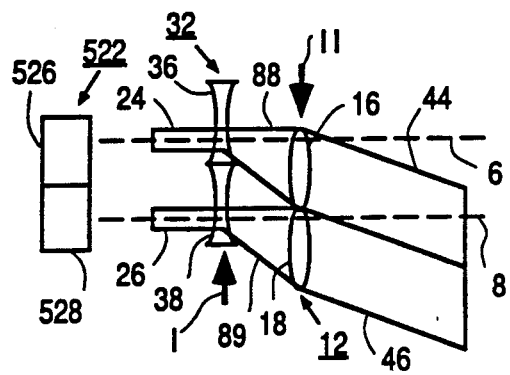

FIG. 7 is generally similar to FIG. 3, but with reversed positions in the cascade of the converging and diverging lens arrays. Elements of FIG. 7 corresponding to those of FIG. 3 are designated by the same reference numerals. In FIG. 7a, source array 522 produces beams 24 and 26 as described in conjunction with FIG. 6. Beams 24 and 26 do not fill the input apertures of lenses 36 and 38, but output beams 44 and 46 completely fill the output apertures of lenses 16 and 18, respectively. In FIG. 7b, lenses 16 and 18 of lens array 12 are translated downward in the direction of arrow II, thereby deflecting output beams 44 and 46 downward. As discussed above, any translation of the output lens array when the input and output apertures of the lenses of the output lens array are full would result in a reduction of peak beam amplitude and generation of sidelobes if the translation were accomplished as described in conjunction with FIG. 3. According to the invention, the translation of lenses 16 and 18 of output lens array 12 downward, in the direction of arrow II, is accompanied by upward translation of input lenses 36 and 38 of input lens array 32, in the direction of arrow I. The upward translation of diverging lenses 36 and 38 of FIG. 7 has as the same effect as the downward translation of lenses 16 and 18 of FIG. 6, in that the apertures of the lenses of the output lens array are not overfilled.

When converging lens array 12 and collimating lens array 32 are translated by the amounts $\Delta_1$ and $\Delta_2$, respectively, the beam steer angles $\theta_x$ as illustrated in FIG. 6b is given by the expression $$\theta_x(\Delta_1, \Delta_2) = \sin^{-1}\left(\frac{\Delta_2 - \Delta'_1}{f_2}\right) \quad (1)$$

where $$\Delta'_1 = f_1\Delta_1\sqrt{\frac{1}{f_1^2 + \Delta_1^2}} \quad (2)$$

and $f_1$ and $f_2$ are the focal lengths of the lenses of arrays 12 and 32, respectively. By selecting the position of collimating output lens array 32 such that $$\Delta_2 = (f_2/f_1)\Delta_1 + \Delta'_1 \quad (3)$$

the steer angle is determined by the translation of the input converging lens array 12, and output collimating lens array 32 does not affect the steer angle, so steering of the beam may be first accomplished by translation of input lens array 12, and when the input apertures of the output lens array are on the verge of overfilling, whereby vignetting might begin to occur, the translation of input lens array 12 is stopped, and translation of output lens array 32 may be used for further beam scanning pursuant to equation (1).

The dual-translation scheme described in conjunction with FIGS. 6 and 7 may be used in cascade or combination with the phase shifters described in conjunction with FIG. 5. The combination provides the advantages over the prior art of a wider range of continuous scanning without reduction of peak amplitude and generation of sidelobes.

FIG. 8a illustrates phase shifter array 540 including transparent phase shifter elements or cells 546 and 548 cascaded with converging lenses 16 and 18 of a first lens array 12 and lenses 234 and 236 of an output lens array 32. In FIG. 8a, phase shifter array 540 is on the input side of the cascade, in FIG. 8b phase shifter array 540 lies between the lens arrays, and in FIG. 8c phase shifter array 540 is behind or on the output side of the cascade. In FIG. 8b, phase shifters 546 and 548 of phase shifter array 540 are located at or near focus plane 99. In FIGS. 8a, 8b and 8c, output lens array 32 is translated parallel to arrow I for deflection. As mentioned in conjunction with FIG. 5, the phase shifter elements of phase shifter array 540 are controlled to correct for piston phase error, to thereby achieve a continuous scan range.

FIG. 9 illustrates a cascade of a phase shifter array 540, a diverging lens array 32, and a converging lens array 12, with the phase shifter array before, between and behind the lens arrays, respectively, and with output converging lens array 12 being translated for scanning. In FIG. 9a, phase shifter 540 has its phase shifters 546 and 548 located between the source array (not illustrated) and diverging lenses 36 and 38 of diverging lens array 32. Converging lenses 16 and 18 of converging lens array 12 are translatable parallel to the direction of arrow I. In FIG. 9b, phase shifter array 540 is located between the converging lens array 32 and converging lens array 12, and in FIG. 9c phase shifter array 540 is the last element of the cascade.

FIGS. 10a, 10b and 10c are similar to FIGS. 8a, 8b and 8c, respectively, with the exception that both lens pairs are translatable. In FIG. 10a, light beams 24 and 26 from the sources (not illustrated) passes through phase shifter cells 546 and 548, respectively, of phase shifter array 540, and then through the lenses of the cascade of lens arrays 12 and 32. In FIG. 10b, the phase shifters of phase shifter array 540 are between the lens arrays at or near focal plane 99, and in FIG. 10c phase shifter array 540 follows the output lens array 32.

FIGS. 11a, 11b and 11c are similar to FIGS. 9a, 9b and 9c, respectively, except that both lens arrays are translatable. In FIG. 11a, phase shifters 546 and 548 of phase shifter array 540 receive light beams 24 and 26 from an array of sources (not illustrated). Phase shifted light from phase shifter array 540 passes through diverging lenses of lens array 32, and then through the converging lenses of lens array 12. In FIG. 11b, phase shifter array 540 is between lens arrays 32 and 12, and in FIG. 11c phase shifter array 540 follows output lens array 12.

The arrangements of FIGS. 8, 9, 10 and 11 have the advantages of a continuous range of scanning, with increased maximum beam amplitude at large scan angles, by comparison with the prior art arrangement.

Figure 12A:
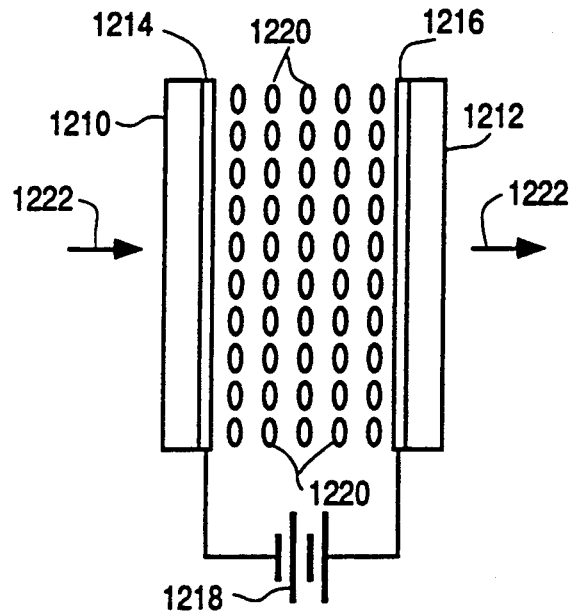
FIGS. 12a and 12b schematically illustrate a liquid crystal phase cell which may be used in the phase shifter array of FIG. 5, and the molecular reorientation which induces a phase change in light transversing the cell.
Figure 12B:
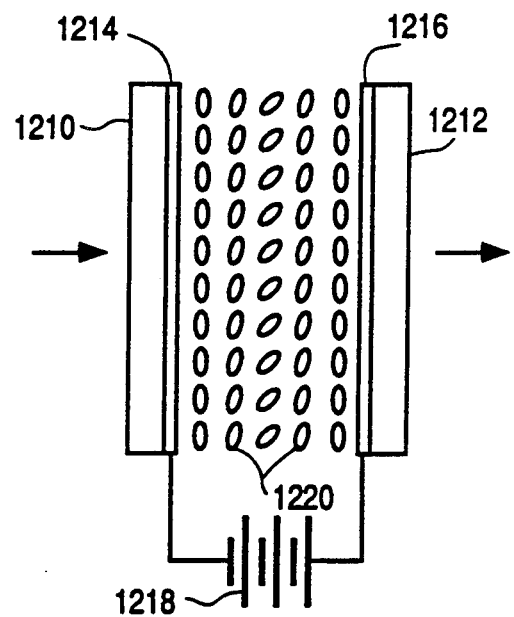

FIGS. 12a and 12b illustrate a liquid crystal phase shifter cell which may be used in an array such as array 540 of FIG. 5a, and which is described in the aforementioned Cassarly et al. paper. FIG. 12a illustrates a liquid crystal phase shifter cell including transparent glass side walls 1210 and 1212, transparent conductive coatings such as indium-tin oxide alloy coatings 1214 and 1216 applied to the inner surfaces of walls 1210 and 1212, respectively. A voltage source illustrated by a battery symbol 1218 is connected to conductor surfaces 1214 and 1216 to apply a voltage to the highly birefringement nematic liquid crystals contained within the cell. Molecules of the liquid crystal material are illustrated as small ellipses designated 1220. As illustrated in FIG. 12a, representing a relatively low voltage condition, the liquid crystal molecules are oriented with their axes in a particular direction, represented in FIG. 12a by a vertical orientation of the major axes of the ellipses. Light represented by arrows 1222 which passes through the cell is phase shifted by an amount which depends upon the rotation of the liquid crystal rotation.

FIG. 12b represents a situation in which a liquid crystal cell has a higher applied voltage. As illustrated in FIG. 12b, at least some of the molecules are rotated, thereby affecting the index of refraction to impart a phase shift different from that imparted in the condition illustrated in FIG. 12a. As discussed in the paper, phase shifts of greater than $2\pi$ are possible, depending upon cell thickness.

Figure 13:
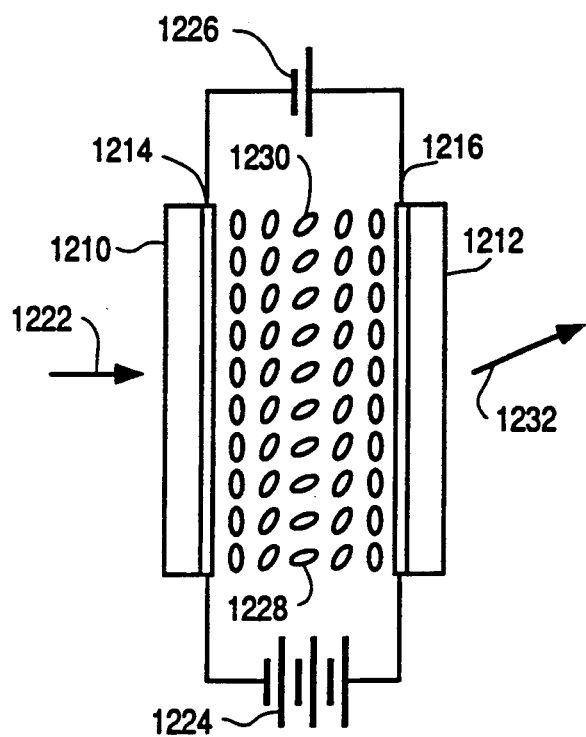
FIG. 13 schematically illustrates a liquid crystal prism phase cell for inducing a phase change which differs for light traversing various locations of the cell.

FIG. 13 illustrates a prism phase shifter cell which may be arrayed with other like cells to produce a prism-like effect, by which light entering at different locations along the cell can be phase shifted by differing amounts, thereby creating a tilted phase front at the output which causes the direction of propagation of light passing through the prism cell to be changed or scanned. In FIG. 13, elements corresponding to those of FIG. 12 are designated by the same reference numerals. As illustrated in FIG. 13, a first voltage source illustrated as 1224 is connected between conductors 1214 and 1216 of the cell at the bottom of the cell, and another voltage source 1226, having a different voltage, is applied across conductors 1214 and 1216 at the top end of the cell. As a result of the voltage difference, current flows through the transparent conductors 1214 and 1216, and a voltage gradient is established between conductors 1214 and 1216 within the cell, which voltage progressively increases between the bottom and the top cell. The voltage gradient results in progressively greater rotations of the molecules 1220 therein as a function of position within the cell. In particular, molecules 1228 at one end are rotated by a greater amount than molecules such as 1230 at the other end. As a result of the difference in rotation of the liquid crystal molecules along the length of the cell, the phase shift imparted to light traversing the cell varies, so as to change the direction of propagation of the light as illustrated by the directions of arrows 1222 and 1232 in FIG. 13.

It should particularly be noted that a prism cell such as that of FIG. 13 may impart both a constant phase shift component and a sloped or prism-type phase shift by appropriate application across the cell of a constant voltage component and a voltage gradient component. For example, if source 1226 produces 1.2 volts and source 1224 produces 1.6 volts, a constant 1.2 volts appears across the cell in conjunction with a voltage gradient of 0.4 volts. Thus, an array of prism cells can perform the functions of both piston phase shift and prism phase shift.

Prism phase shifter cells such as that of FIG. 13 may be arrayed in the manner illustrated in FIG. 5, and such an additional array may be cascaded with an arrangement such as that of FIG. 5 or with one of those of FIGS. 8, 9, 10 or 11 to provide further deflection. When an array of prism phase shifters such as that of FIG. 13 is arrayed with pairs of converging lenses such as with FIGS. 6, 7, 8 or 10, the array may have less of a scanning range when the array of prism phase shifters is placed directly on focus plane 99, because a substantial part of the light would in that case pass through the center of each prism cell, and the desired progressive phase shift arising from the passage of light through different portions of the phase cell would not occur. A prism phase shifter array placed near the focus of a two-lens array system may be used to aid in reducing overfilling of the apertures of the lenses of the output array. As mentioned, if phase shifter array 540 of FIGS.

5, 8, 9, 10 or 11 includes prism cells as described in FIG. 13, only one phase shifter array is needed.

Figure 14:
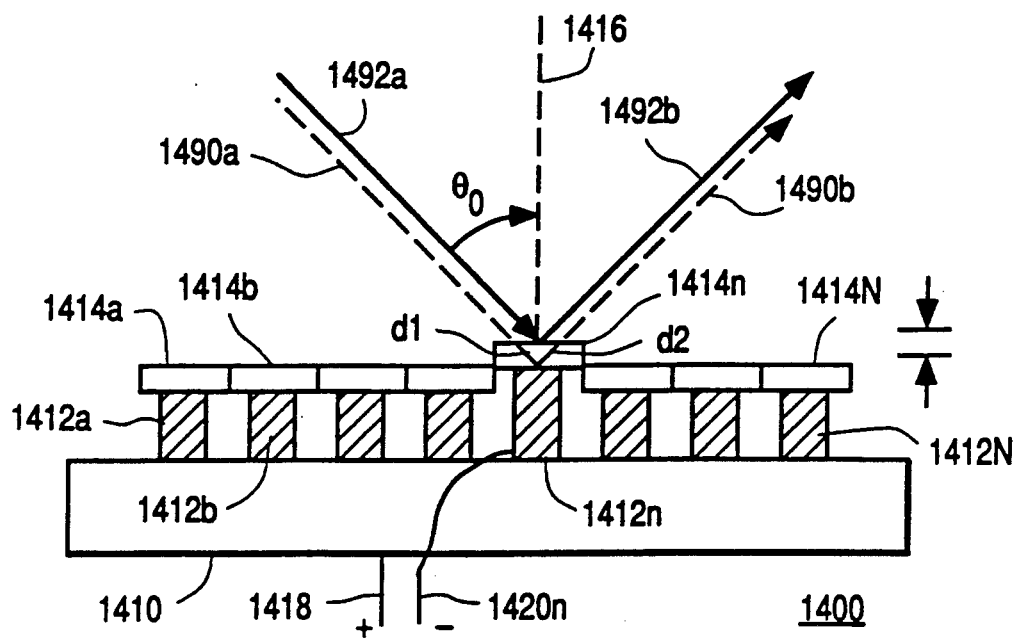
FIG. 14 illustrates an electromechanical phase shifter array using electromechanical actuators for reflective elements.

FIG. 14 illustrates a reflective phase shifter array. In FIG. 14, an electrically conductive mounting block 1410 supports an array of piezoelectric actuator 1412a, 1412b . . . 1412n . . . 1412N. Each piezoelectric actuator 1412 supports an optically reflective surface illustrated as 1414a, 1414b . . . 1414N. Reflective surfaces 1414 have mutually parallel normals. The normal of reflective surface 1414n is illustrated as 1416. As is well known to those skilled in the art, light represented by a dash line 1490a arriving at an undeflected reflective surface and making an angle $\theta_0$ with normal 1416 is reflected (line 1490b) at the same angle relative to the normal. Solid line 1492a represents the incoming light ray, which reflects from deflected reflector 1414n to reduce reflected ray 1492b. The change in optical path length is approximately $d_1+d_2$ when $\theta_0$ is small, and may be calculated as $2 d \cos \theta$, where d is the amount of movement of the reflector surface. As illustrated in FIG. 14, a common electrical conductor 1418 is connected to mounting 1410, and is therefore connected to all elements 1412. Each element 1412 is connected by a separate conductor to the control arrangement. The control conductor for element 1412n is illustrated as 1420n. Voltage applied to conductor 1420n relative to conductor 1418 causes motion of element 1412n.

Figure 15:
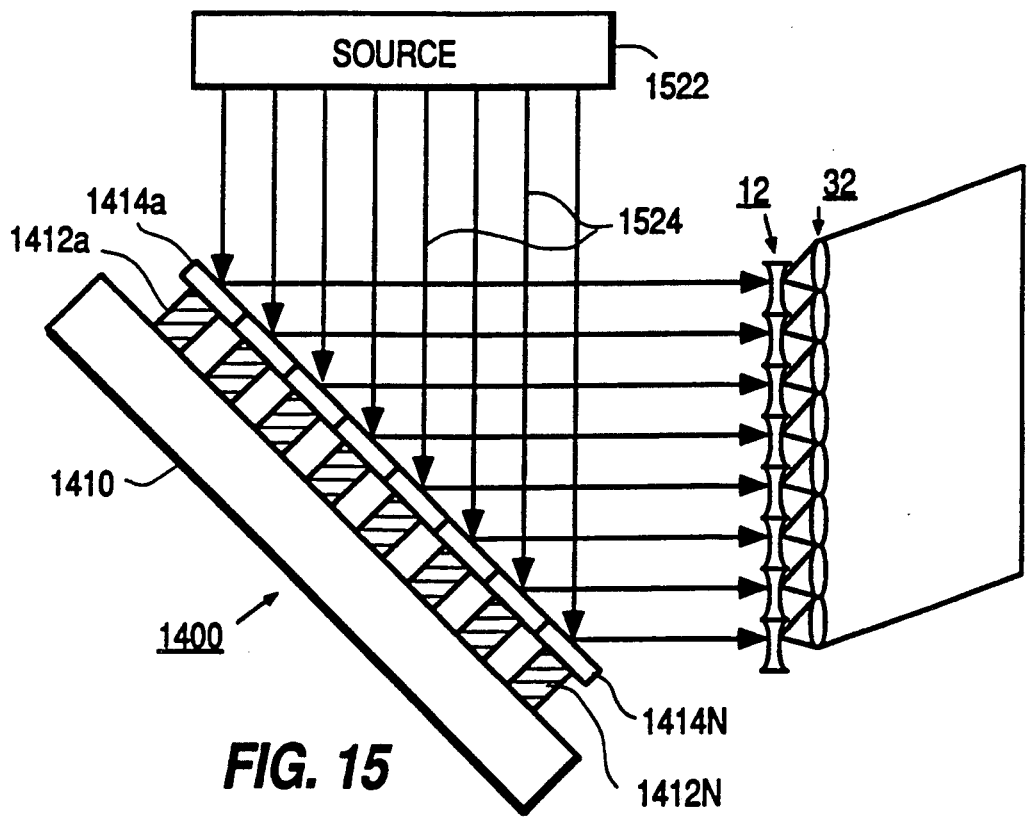
FIG. 15 illustrates how they are used in a location before a cascade of two lens arrays.

The array illustrated in FIG. 14 may be used for providing piston phase shifts in accordance with the invention. As illustrated in FIG. 15, a source array illustrated as 1522 produces beams of light illustrated as 1524 which are directed at the reflective elements of array 1400. The phase shifter array is oriented so as to reflect the light beams, suitably phase shifted under control (not illustrated) to a cascade of lens arrays such as 12 and 32, which may be relatively translated as described in detail above. By bending the light path, a reflective phase shifter array such as 1400 of FIG. 14 may be used between a pair of lens arrays, or following the output lens array.

Figure 16:
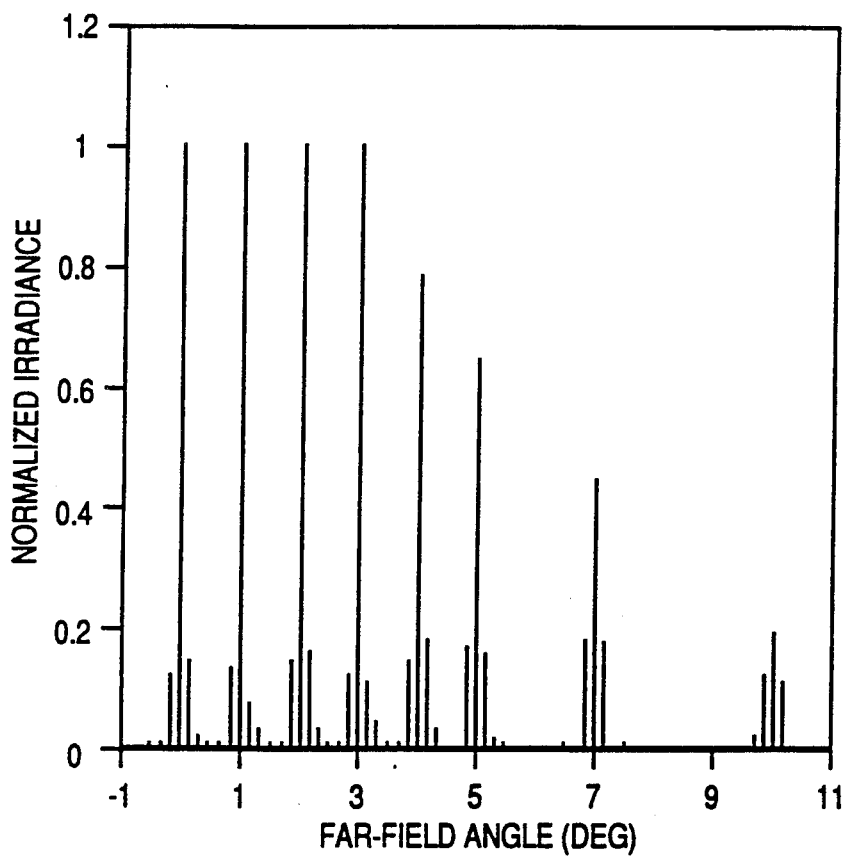
FIG. 16 is a plot of beam irradiance versus scan angle for a prior art scanning arrangement such as that of FIG. 1 or 2.
Figure 17:
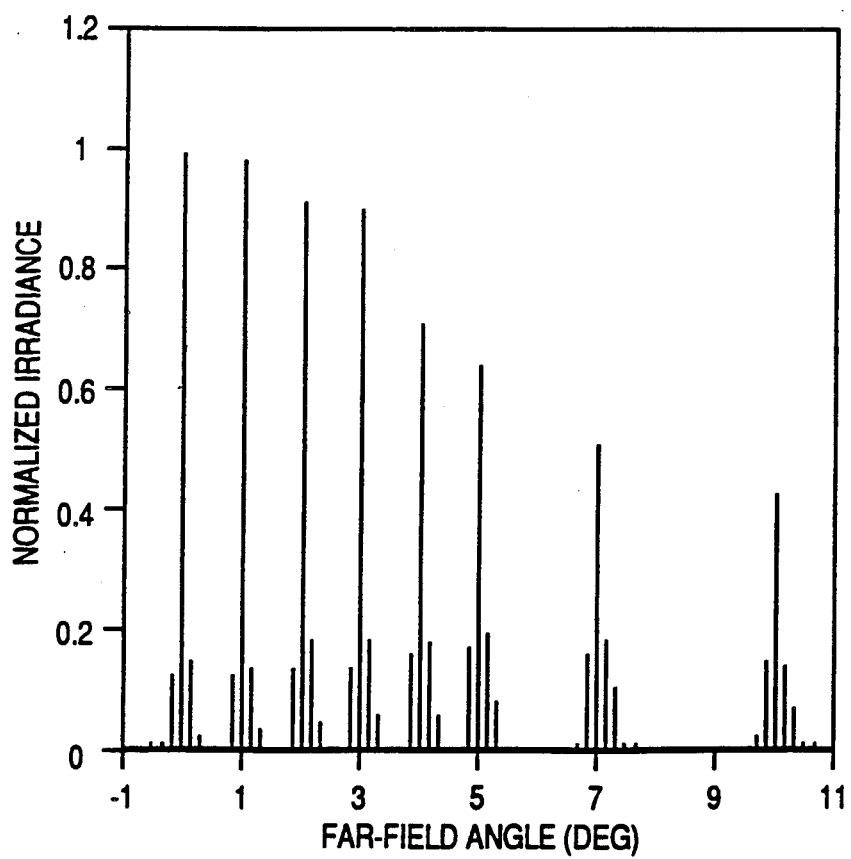
FIG. 17 is a plot of beam irradiance versus scan angle for an arrangement according to the invention, such as the arrangement of FIGS. 6 or 7, showing an amplitude advantage at large scan angles.

FIG. 16 illustrates normalized irradiance as a function of scan angle of the main light beam in the far field of an arrangement such as that of FIGS. 2 or 3 on a laboratory set up. As illustrated in FIG. 16, normalized irradiance is unity at near-in (0° to 2°), but the amplitude of large angles, such as at 10°, falls to as low as 0.2. FIG. 17 illustrates the normalized irradiance using an arrangement according to the invention, such as that of FIGS. 6 or 7. As illustrated, the irradiance at 10° is greater than 0.4, corresponding to an increase in power of about 3 dB. The improvement is believed to be less than that achievable with a more sophisticated assembly.

Figure 18A:
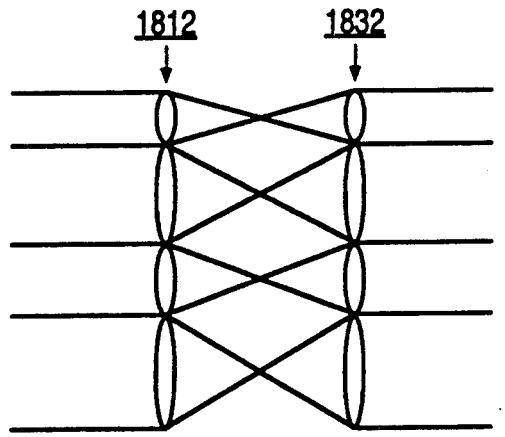
FIGS. 18a and 18b illustrates cascaded lens arrays in which the lenses are not arrayed in a regular or periodic fashion.
Figure 18B:
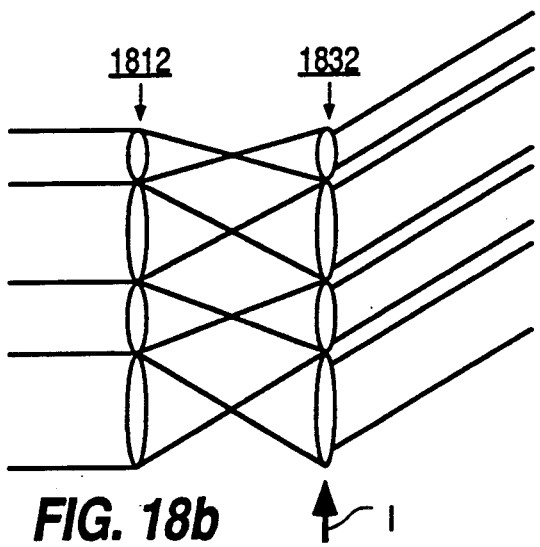

FIG. 18a illustrates a first lens array 1812 and a second lens 1832, in which the lenses of the lens arrays have different diameters but identical focal lengths, and nonperiodic or random element-to-element spacing. When lens array 1832 is translated upward relative to lens array 1812 as illustrated in FIG. 18b, same kind of scanning takes place as would be the case if the lenses had periodic spacing. However, the far-field sidelobes are substantially reduced by the effective randomization of the period of the array.

Figure 19:
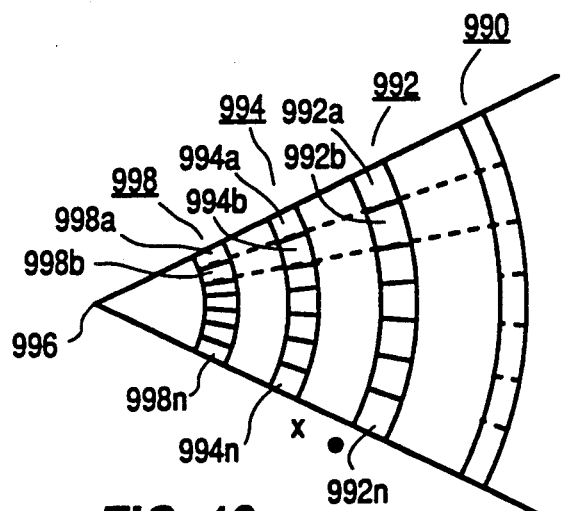
FIG. 19 is a plan view of a cascade of sources, lenses, and phase shifters, which are arrayed in a nonplanar fashion, but in which the array elements subtend corresponding angular dimensions as seen from a point.

FIG. 19 illustrates a plan view of an arrangement according to the invention, in which the arrays are curved. In FIG. 19 an array 998 of laser diodes include diodes 998a, 998b . . . 998N, which direct their light beams radially away from a central point 996. Each laser may have dimensions which define an angle $\alpha$ subtended by the laser beam as seen from center 996. A curved array 994 of lenses includes lenses 994a, 994b . . . 994N, which are spaced in a corresponding manner, i.e. the physical dimensions of the individual lenses are selected so that the lenses subtend the same angle $\alpha$ as seen from the center 996, whereby each lens is associated with one laser, and the lasers of array 998 are registered with the lenses of array 994, so that the light beam from a laser passes through a corresponding lens, even though the lateral dimensions of the array elements differ.

From the above discussion of FIG. 19, it will be clear that the angular spacing of the elemental lenses 992a, 992b . . . 992N of a curved second lens array 992 is also $\alpha$, and that the lenses of array 992 are registered with the lenses of array 994 and lasers of array 998 even though the lateral dimensions differ. Arrays 992 and 994 may be translated in a direction in and out of the plane of the FIGURE, as suggested by the x (into the FIGURE) adjacent array 994 and the . (out of the FIGURE) adjacent array 992. If a phase-shifter array is used, as suggested by dotted-line outline 990, the same dimensioning is used.

While straight-line translation into and out of the plane of FIG. 19 may be used as described above, a relative rotational movement of the arrays about a center point 996 will also provide beam scanning. Thus, array 998 as illustrated in FIG. 19 may be considered to be a sectional view of a two-dimensional array curved into a spherical form.

Other embodiments of the invention will be apparent to those skilled in the art. For example, array of sources 522 of FIG. 5 may be translated relative to microlens array 510 instead of translating the microlens array. The various arrays have been illustrated with relatively small numbers of elements, but arrays of hundreds, thousands or even more elements may be useful. Arrays of laser diodes have been described as the source, but other sources of light or electromagnetic radiation may be used, and the same principles may be used for microwaves or millimeter-waves or for other electromagnetic radiation having longer or shorter wavelengths than light, so long as the lenses and phase shifters are appropriately dimensioned. While the lenses of the arrays have not been described in detail, they may be round or oblong to match the cross-sectional shape of the associated light beams, and their curvature may be continuous, or it may be binary as known in the art.

What is claimed is:

1. A beam steering arrangement for a plurality of sources of beams of electromagnetic radiation arrayed with a preselected source-to-source spacing, comprising:

a first lens array, said first lens array including a first plurality of lenses, said lenses of said first lens array being arrayed with a lens-to-lens spacing which corresponds to said preselected source-to-source spacing, the lenses of said first lens array being selected to be one of converging and diverging lenses, for generating output beams from the lenses of said first lens array, which output beams include diverging beam portions;

a second lens array, said second lens array including a plurality of lenses, which plurality may equal said first plurality, said lenses of said second lens array being converging lenses, for, when illuminated by diverging beams, collimating said diverging beams to produce collimated output beams;

first mounting means coupled to said first lens array for holding said first lens array to intercept said beams from said sources, for thereby generating said diverging beam portions from said first lens array;

second mounting means coupled to said second lens array for holding said second lens array to intercept said diverging beam portions for thereby generating said collimated output beams from said second lens array;

first translating means coupled to said second mounting means and said second lens array for translating said second lens array in a direction generally transverse to said beams, for thereby scanning said collimated beams, whereby scanning at some angles causes each of said diverging beams to illuminate at least two adjacent ones of said output lenses, thereby resulting in reduction in peak amplitude of said collimated beams; and second translating means coupled to said first mounting means for translating said first mounting means and said first lens array in a direction generally parallel to said transverse direction, for scanning said output beams of said first lens array so that each of said output beams of said first lens array substantially illuminates only one of said lenses of said second lens array.

2. An arrangement according to claim 1 wherein said lenses of said second array are converging lenses.

3. An arrangement according to claim 2 wherein said first translating means translates said second mounting means in a direction corresponding to the desired direction of deflection of said collimated beams.

4. An arrangement according to claim 3, wherein said lenses of said first lens array are diverging lenses, and said second translating means translates said first mounting means in a direction opposite to that of the desired direction of deflection of said collimated beams.

5. An arrangement according to claim 3 wherein said lenses of said first lens array are converging lenses, and said second translating means translates said first mounting means in a direction corresponding to the desired direction of deflection of said collimated beams.

6. An arrangement according to claim 1 wherein said lenses of said first lens array are dimensioned to be larger than the cross-sections of said beams from said sources, so that the input apertures of said lenses of said first lens array are underfilled.

7. An arrangement according to claim 1 wherein said lenses are binary.

8. An arrangement according to claim 1 wherein said preselected source-to-source spacing is more than one wavelength at a frequency near that of the frequency of maximum amplitude radiation.

9. An arrangement according to claim 1 wherein said sources are arrayed in line.

10. An arrangement according to claim 1 wherein said sources are arrayed in two dimensions.

11. An arrangement according to claim 1 wherein said lens arrays have regular spacing between elements.

12. An arrangement according to claim 1, further comprising an array of a plurality of phase shifters, which plurality may equal said first plurality;

mounting means coupled to said array of phase shifters for mounting said phase shifters in cascade with said first and second lens arrays; and control means coupled to said array of phase shifters for controlling said phase shifters for phase-shifting said beams in said cascade so as to reduce toward zero the phase difference between mutually adjacent beams for reducing grating lobe effects.

13. An arrangement according to claim 12 wherein said phase shifters of said array of phase shifters are liquid crystal phase shifters.

14. An arrangement according to claim 12 wherein said phase shifters of said phase shifter array are reflective.

15. A beam steering arrangement comprising:

a plurality of sources of beams of electromagnetic radiation arrayed along curves centered on a point and with preselected source-to-source spacing:

a first lens array, said first lens array including a first plurality of lenses, said lenses of said first lens array being arrayed with a lens-to-lens spacing which corresponds to said preselected source-to-source spacing, the lenses of said first lens array being selected to be one of converging and diverging lenses, for generating output beams from the lenses of said first lens array, which output beams include diverging beam portions;

a second lens array, said second lens array including a plurality of lenses, which plurality may equal to said first plurality, said lenses of said second lens array being converging lenses, for, when illuminated by diverging beams, collimating said diverging beams to produce collimated output beams;

first mounting means coupled to said first lens array for holding said first lens array to intercept said beams from said sources, for thereby generating said diverging beam portions from said first lens array;

second mounting means coupled to said second lens array for holding said second lens array to intercept said diverging beam portions for thereby generating said collimated output beams from said second lens array;

first translating means coupled to said second mounting means and said second lens array for translating said second lens array in a direction generally transverse to said beams, for thereby scanning said collimated beams, whereby scanning at some angles causes each of said diverging beams to illuminate at least two adjacent ones of said output lenses, thereby resulting in reduction in peak amplitude of said collimated beams; and second translating means coupled to said first mounting means for translating said first mounting means and said first lens array in a direction generally parallel to said transverse direction, for scanning said output beams of said first lens array so that each of said output beams of said first lens array substantially illuminates only one of said lenses of said second lens array.

16. A method for steering a plurality of beams from an array of sources of beams, comprising the steps of:

passing each of said beams from one of said sources through a lens of a first lens array selected for forming a beam including a diverging beam portion;

intercepting each of said diverging beam portions with the input aperture of a converging lens of a second lens array for forming a plurality of collimated beams;

translating said second lens array in a direction transverse to the undeflected direction of propagation of said collimated beams to deflect said collimated beams in a selected direction, whereby increased translation may result in overfilling said input apertures of said lenses of said second lens array, thereby reducing beam intensity; and translating said first lens array in a direction generally parallel to said direction of translation of said second lens array in a manner selected to reduce said overfilling of said input apertures of said lenses of said second lens array and thereby restore said beam intensity.

17. A method according to claim 16 further comprising the step of phase-shifting at least one of said beams from said array of sources, said beams including diverging beam portions, and said collimated beams for reducing toward zero the phase difference between adjacent portions of adjacent ones of said collimated beams.

* * * * *